United States Patent
Kim

(10) Patent No.: US 8,102,489 B2
(45) Date of Patent: Jan. 24, 2012

(54) LIQUID CRYSTAL DISPLAY DEVICE HAVING BLACK MATRIX IN REGION OUTSIDE OF PIXEL REGION AND METHOD FOR FABRICATING THE SAME

(75) Inventor: Dong-Guk Kim, Gyeonggi-Do (KR)

(73) Assignee: LG Display Co., Ltd, Seoul (KR)

( * ) Notice: Subject to any disclaimer, the term of this patent is extended or adjusted under 35 U.S.C. 154(b) by 470 days.

(21) Appl. No.: 11/158,009

(22) Filed: Jun. 22, 2005

(65) Prior Publication Data

US 2005/0285995 A1 Dec. 29, 2005

(30) Foreign Application Priority Data

Jun. 29, 2004 (KR) .................. 10-2004-0049779

(51) Int. Cl.
*G02F 1/1333* (2006.01)
*G02F 1/1335* (2006.01)
*G02F 1/1339* (2006.01)
(52) U.S. Cl. ........... 349/110; 349/40; 349/106; 349/153
(58) Field of Classification Search ................... 349/105, 349/40, 106, 110, 153
See application file for complete search history.

(56) References Cited

U.S. PATENT DOCUMENTS

| | | | | |
|---|---|---|---|---|
| 5,844,645 A | * | 12/1998 | Kashimoto | 349/106 |
| 5,907,379 A | * | 5/1999 | Kim et al. | 349/141 |
| 5,949,502 A | * | 9/1999 | Matsunaga et al. | 349/40 |
| 6,064,451 A | * | 5/2000 | Oh et al. | 349/40 |
| 6,339,457 B1 | * | 1/2002 | Won | 349/58 |
| 6,445,432 B2 | * | 9/2002 | Yamamoto et al. | 349/106 |
| 6,587,160 B2 | * | 7/2003 | Lee et al. | 349/40 |
| 7,180,559 B2 | | 2/2007 | Chang et al. | |
| 7,333,167 B2 | * | 2/2008 | Kawase | 349/106 |
| 2002/0060768 A1 | * | 5/2002 | Chung et al. | 349/139 |
| 2002/0140883 A1 | * | 10/2002 | Okamoto et al. | 349/110 |
| 2003/0090608 A1 | * | 5/2003 | Kim et al. | 349/110 |
| 2003/0123017 A1 | * | 7/2003 | Kim et al. | 349/153 |
| 2004/0109108 A1 | * | 6/2004 | Lee et al. | 349/106 |
| 2004/0218108 A1 | * | 11/2004 | Ko et al. | 349/40 |
| 2004/0227873 A1 | * | 11/2004 | Peng et al. | 349/106 |

FOREIGN PATENT DOCUMENTS

CN 1507009 A 6/2004

* cited by examiner

*Primary Examiner* — Mark Robinson
*Assistant Examiner* — Paisley L Arendt
(74) *Attorney, Agent, or Firm* — McKenna Long & Aldridge, LLP

(57) ABSTRACT

A color filter on thin film transistor (COT) type liquid crystal display device includes a pixel region having a plurality of unit pixels defined by intersections of gate and data lines, the gate and data lines formed on a first substrate, a pad region receiving driving signals and applying the driving signals to the gate and data lines, a seal pattern between the pad region and the pixel region, an outside region having a first black matrix, the outside region being between the seal pattern and the pixel region and the first black matrix formed on the first substrate, and an electrostatic discharge circuit between the pad region and the pixel region, the electrostatic discharge circuit formed on the first substrate.

4 Claims, 5 Drawing Sheets

LIQUID CRYSTAL DISPLAY DEVICE HAVING BLACK MATRIX IN REGION OUTSIDE OF PIXEL REGION AND METHOD FOR FABRICATING THE SAME

The present invention claims the benefit of Korean Patent Application No. 49779/2004 filed in Korea on Jun. 29, 2004, which is hereby incorporated by reference.

BACKGROUND OF THE INVENTION

1. Field of the Invention

The present invention relates to a liquid crystal display device, and more particularly, to a color filter on thin film transistor type liquid crystal display device having a black matrix in an outside region immediately adjacent to a pixel region.

2. Discussion of the Related Art

A liquid crystal display (LCD) device is a display device for displaying an image using liquid crystal molecules having a refractive anisotropy and a dielectric anisotropy. In general, an LCD device includes an array substrate in which unit pixels are arranged in a matrix form, a color filter substrate facing the array substrate and displaying an image in color, and a liquid crystal layer between the array substrate and the color filter substrate.

A TN (twisted nematic) mode LCD device which provides vivid colors with high brightness is being widely used these days. The TN mode LCD device includes an array substrate in which unit pixels are arranged in a matrix form, a color filter substrate having a color filter layer and facing the array substrate, and a liquid crystal layer formed such that liquid crystal molecules are twisted between the two substrates. In addition, a thin film transistor (TFT), which is a switching device for a unit pixel, is formed at each pixel of the array substrate. Thus, the array substrate is often referred to as a TFT array substrate.

Because the LCD device cannot generate light by itself, the LCD device includes a backlight assembly for supplying light from the outside. In general, in a TN mode LCD device, light advances from under the TFT array substrate and passes through the liquid crystal layer and the upper color filter layer to display an image. Part of the light advancing from under the TFT array substrate is unnecessary, which should be blocked. Therefore, a black matrix is formed to block the unnecessary light.

In general, the black matrix is formed of an opaque metal thin film or an organic film on a color filter layer. However, the LCD device in which the black matrix is formed on the color filter substrate is disadvantageous in that it is difficult to precisely attach the array substrate and color filter substrate together. Therefore, a color filter on TFT (COT) type LCD device has been proposed.

In a COT type LCD device, a black matrix and a color filter layer are formed on an array substrate so that an LCD panel forming process concentrates on the array substrate, and the alignment between the array substrate and the color filter substrate during an attachment is easily facilitated.

FIG. 1 is a cross-sectional view illustrating a COT type LCD device in accordance with the related art. In FIG. 1, a COT type LCD device includes a color filter layer 110 and a black matrix 111 on a lower substrate 101. The COT type LCD device also includes an upper substrate 150 facing the lower substrate 101 and a liquid crystal layer 140 between the lower and upper substrates 101 and 150. The lower substrate 101 includes gate lines (not shown) and data lines 108 intersecting each other and defining a plurality of unit pixels. In addition, the lower substrate 101 includes a TFT at one side of every unit pixel, a color filter layer 110 at every unit pixel, and a black matrix 111 between the color filter layers 110.

Although not shown, the plurality of TFTs are arranged in a matrix form on the lower substrate 101, which is a transparent glass substrate. The TFT includes a gate electrode 103 for receiving a scan signal, a gate insulation layer 102 formed on the gate electrode 103, an active layer 104, which is a semiconductor layer formed on the gate insulation layer 102, and an ohmic contact layer 107 contacting the active layer 104 with source and drain electrodes 105 and 106. Further, a passivation layer 109 for protecting and insulating the TFT from the outside is formed on the TFT.

The black matrix 111 is formed on the passivation layer 109. The black matrix 111 is arranged in a matrix form for blocking the unnecessary light leaked from and passing through a reverse tilt domain region around the gate line (not shown) and the data line 108 and the like. In addition, the color filter 110 having one of red, green and blue sub-color filters is formed on the passivation layer 109 at each of the unit pixels.

A pixel electrode 112 also is formed on the passivation layer 109. In particular, a contact hole is formed in the color filter 110 and the passivation layer 109 for exposing the drain electrode 106 of the TFT, such that the pixel electrode 112 is connected to the drain electrode 106 through the contact hole.

The upper substrate 150, which is a glass substrate, includes a common electrode 151 and an alignment layer 152. The alignment layer 152 is formed on the common electrode 151 for aligning liquid crystal molecules of the liquid crystal layer 140.

The lower substrate 101 generally is referred to as a TFT array substrate. The TFT array substrate includes a pixel region where the pixel electrode 112 is formed, pad regions where a gate pad and a data pad for supplying a gate voltage and a data voltage are formed, a seal forming region where a sealant for attaching the upper substrate and the array substrate together is formed, and an outside region between the pixel region and the seal forming region.

FIG. 2 is a cross-sectional view illustrating edge portions of the COT type LCD device shown in FIG. 1. As shown in FIG. 2, the array substrate includes a pixel region A, an outside region O adjacent to the pixel region A, a seal forming region P where a seal line 170 is formed, and a pad region Q in which various pads are formed. A spacer 172 is formed between an array substrate 160 including a lower substrate 101 and an upper substrate 150. A gate pad electrode 176 is formed on the lower substrate 101.

An electrostatic discharge (ESD) circuit 171 is formed between the pixel region A and the seal line 170, namely, at the outside region O. The ESD circuit 171 may be constructed by a combination of a plurality of TFTs, and one electrode thereof is connected to the pad region Q and its other electrode is connected to other lines of the pixel regions by Indium Tin Oxide (ITO). Therefore, when the external static electricity enters through the pad region Q, the ESD circuit 171 is operated to disperse the static electricity to the LCD panel and to block the static electricity from being applied to the pixel region A, thereby protecting the pixel.

However, light leakage of a backlight occurs at the outside region O because the outside region O having the ESD circuit 171 is covered with a transparent passivation layer. In order to solve such a problem, there has been an attempt to prevent the leakage of light using a top case 175 encompassing the LCD panel. However, because the top case 175 should not contact with a polarization plate 174 installed at an outside of the upper substrate 150, the top case 175 does not completely cover the outside region O, thereby failing to completely prevent light leakage.

Thus, an additional black matrix 173 of an opaque metal layer is formed on the upper substrate 150 corresponding to the outside region O. As a result, a black matrix forming process is performed twice, one in an array substrate fabricating process and another in an upper substrate fabricating process, thereby reducing production efficiency and increasing fabrication costs.

SUMMARY OF THE INVENTION

Accordingly, the present invention is directed to a liquid crystal display device that substantially obviates one or more of the problems due to limitations and disadvantages of the related art.

An object of the present invention is to provide a liquid crystal display device having a black matrix in an outside region, thereby preventing light leakage occurring at the outside region. The black matrix in the outside region is extended from a pixel region or is a black matrix in addition to a black matrix in the pixel region.

Another object of the present invention is to provide a method for fabricating a liquid crystal display device that omits forming a black matrix on an upper substrate.

Yet, another object of the present invention is to provide a method for fabricating a liquid crystal display device having shortened fabricating process by forming a black matrix in an outside region when forming a black matrix in a pixel region on an array substrate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a color filter on thin film transistor (COT) type liquid crystal display device includes a pixel region having a plurality of unit pixels defined by intersections of gate and data lines, the gate and data lines formed on a first substrate, a pad region receiving driving signals and applying the driving signals to the gate and data lines, a seal pattern between the pad region and the pixel region, an outside region having a first black matrix, the outside region being between the seal pattern and the pixel region and the first black matrix formed on the first substrate, and an electrostatic discharge circuit between the pad region and the pixel region, the electrostatic discharge circuit formed on the first substrate.

In another aspect, a liquid crystal display device includes a first substrate including a thin film transistor, a passivation layer on the thin film transistor, a color filter layer on the passivation layer, a first black matrix on the passivation layer covering the thin film transistor, and an electrostatic discharge circuit, a second substrate facing the first substrate, a seal pattern attaching the first and second substrates to each other, the seal pattern covering the electrostatic discharge circuit, and a liquid crystal layer between the first and second substrates.

In another aspect, a method for manufacturing a color filter on thin film transistor (COT) type liquid crystal display device includes forming a thin film transistor in a pixel region on a first substrate, the thin film transistor including a gate electrode, an active layer and source and drain electrodes, forming a passivation layer above the thin film transistor, forming a black matrix extending to an outside portion of the pixel region on the passivation layer, forming a color filter layer at the pixel region, and forming a pixel electrode on the color filter layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
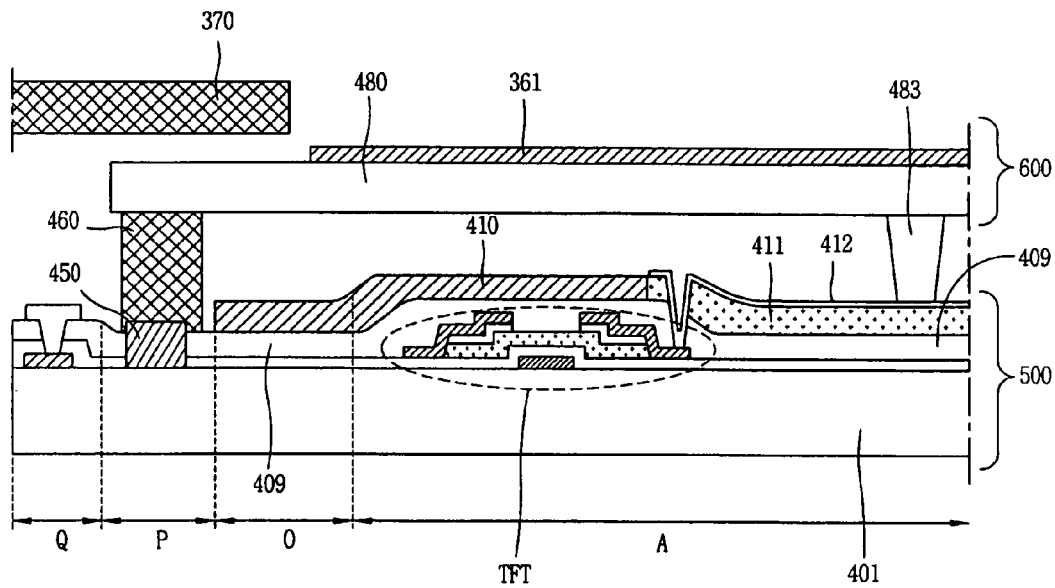
FIG. 3 is a cross-sectional view illustrating a COT type LCD device in accordance with an embodiment of the present invention.

FIG. 3 is a cross-sectional view illustrating a COT type LCD device in accordance with an embodiment of the present invention. In FIG. 3, an LCD device includes an array substrate 500 including a color filter layer and an upper substrate 600 facing the array substrate 500. The array substrate 500 and the upper substrate 600 are attached together by a seal pattern 460. A plurality of gate lines (not shown) and a plurality of data lines (not shown) intersecting the gate lines are formed in a pixel region A on a lower substrate 401 of the array substrate 500, thereby defining a plurality of unit pixels.

In addition, a thin film transistor (TFT), which is a switching device, is formed at one side of each of the unit pixels on the array substrate 500. The TFT applying data voltage to the unit pixel is insulated from the outside by a passivation layer 409. Also, a black matrix 410 for covering a reverse tilt domain region such as a gate line, a data line or the like is formed on the passivation layer 409. The black matrix 410 also covers a region where the TFT is formed. In particular, the black matrix 410 is arranged in a matrix form in the pixel region A and covers the reverse tilt domain region. Also, a color filter layer 411 is formed at each of the unit pixels on the array substrate 500. The color filter layer 411 may include one of red, green and blue sub-color filter layers. Further, a pixel electrode 412 is formed on the color filter layer 411 at every unit pixel, and the pixel electrode 412 is connected to the drain electrode of the TFT.

The black matrix 410 is not only in the pixel region A but also extends to an outside region O that is immediately adjacent to the pixel region A. Because the black matrix 410 is formed extending to the outside region O, leakage of light through the outside region O is prevented.

Figure 1:
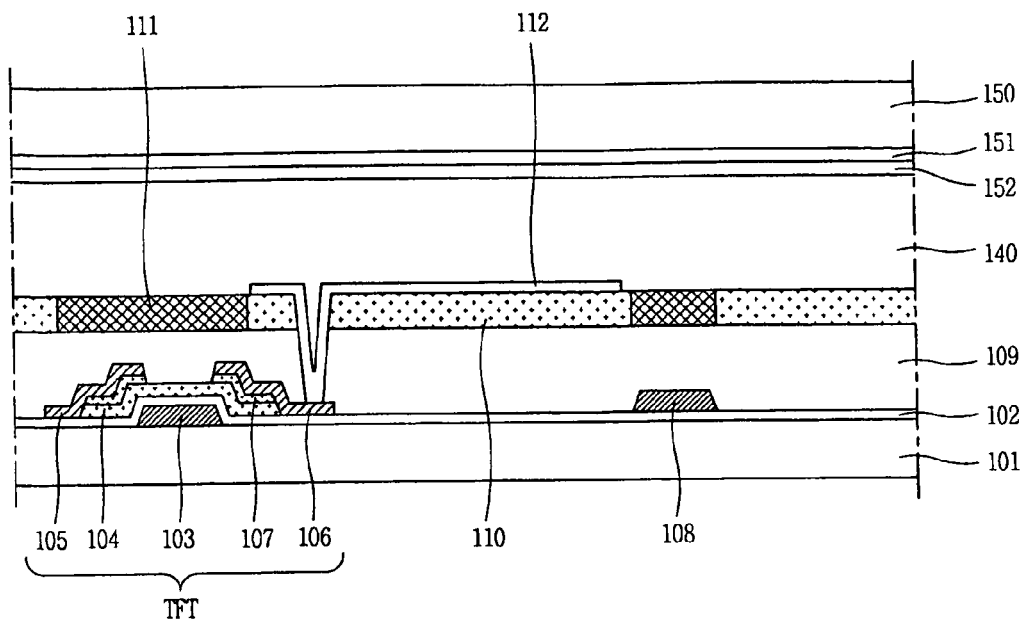
FIG. 1 is a cross-sectional view illustrating a COT type LCD device in accordance with the related art.
Figure 2:
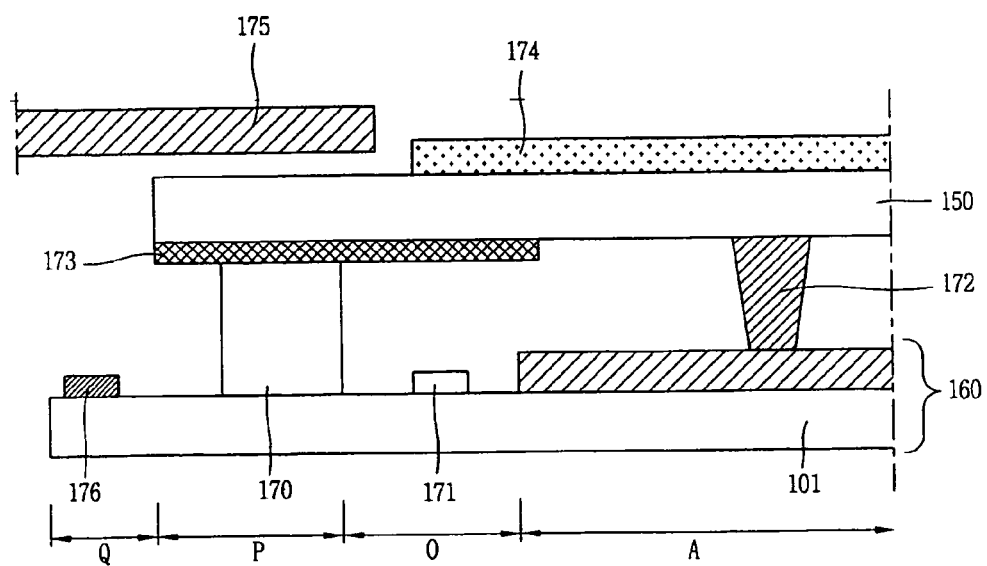
FIG. 2 is a cross-sectional view illustrating edge portions of the COT type LCD device shown in FIG. 1.

However, as shown in FIG. 2, it is difficult to form a black matrix at the outside region O in an LCD device according to the related art, because an electrostatic discharge (ESD) circuit is formed in the outside region O. Thus, as shown in FIG. 3, the LCD device according to an embodiment of the present invention includes an ESD circuit 450 formed in a seal line forming region P Although not shown, the ESD circuit 450 may include a plurality of thin film transistors, and one electrode of the ESD circuit 450 is connected to a gate pad or a data pad and the other electrode thereof is connected to a gate line and a data line of the array substrate 500 or to a common electrode of the upper substrate 600. The gate pad and the data pad may be in a pad region Q where a gate signal and a data signal are input from an external source (not shown).

The ESD circuit 450 discharges static electricity flowing from the outside and blocking static electricity from the pixel region A. The ESD circuit 450 may be connected to the pad region Q and a plurality of lines within the pixel region A by a pixel electrode material, e.g., ITO. In particular, the connection is made through a plurality of contact holes (not shown) formed in the passivation layer 409.

In addition, since the black matrix 410 may include a thick organic layer, it becomes difficult to form the contact holes in the passivation layer 409. In particular, because the black matrix 410 is relatively thick, fine etching thereon is difficult and accordingly, the contact hole which exposes the ESD circuit 450 may not be formed. Thus, the ESD circuit 450 is formed under the seal pattern 460 because the seal pattern 460 may be formed after the ITO line connects the ESD circuit 450 with the various lines of the pixel region A and of the upper substrate 600, the seal pattern 460 may be formed on the ESD circuit 450. As a result, the ESD circuit 450 which is not covered with the black matrix 410 may be formed while the black matrix 410 is formed extending to the outside region O.

Moreover, the upper substrate 600 includes a second substrate 480. The second substrate 480 may be formed of transparent glass. Although not shown, a common electrode and an alignment layer are formed on the second substrate 480 facing the array substrate 500. The common electrode on the upper substrate 600 and the pixel electrode 412 on the array substrate 500 may generate an electric field to control liquid crystal molecules of a liquid crystal layer between the upper and array substrates 600 and 500, thereby displaying images.

In order to maintain a cell-gap between the upper substrate 600 and the array substrate 500, a plurality of spacers 483 are formed on the upper substrate 600 or the array substrate 500. In addition, a polarization plate 361 is formed at an outer surface of the upper substrate 600, and another polarization plate 361 (not shown) is formed at an outer surface of the array substrate 500.

An LCD panel formed by the upper substrate 600 and the array substrate 500 attached to each other is protected by module devices. For example, one of the module devices is a top case 370 that covers an edge of the LCD panel thereon. The top case 370 protects the LCD panel from an external impact or the like, and also prevents light leakage which may occur at the outside region O of the array substrate 500. Thus, a location of the ESD circuit 450 may be adjusted by adjusting a location of the top case 370.

Figure 4:
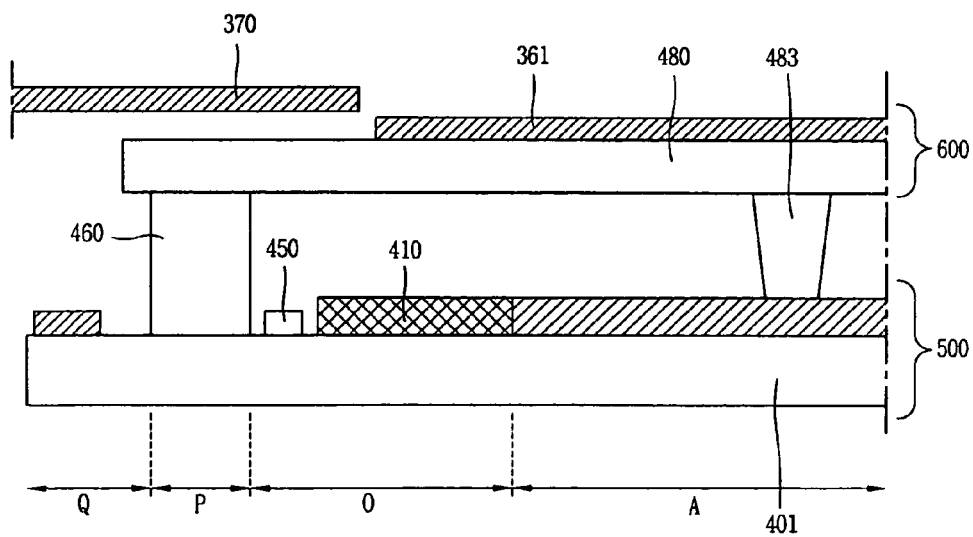
FIG. 4 is a cross-sectional view illustrating a COT type LCD device in accordance with another embodiment of the present invention.

FIG. 4 is a cross-sectional view illustrating a COT type LCD device in accordance with another embodiment of the present invention. In FIG. 4, an array substrate 500 includes a pixel region A, a seal line forming region P in which the seal pattern 460 is formed, an outside region O formed between the seal line forming region P and the pixel region A, and a pad region Q to which a gate voltage or a data voltage is applied. Although not shown, a TFT, a pixel electrode and a color filter layer are formed at every unit pixel within the pixel region A on a lower substrate 401 of the array substrate 500.

An ESD circuit 450 is formed adjacent to the seal pattern 460 in the outside region O. The outside region O excluding its portion where the ESD circuit is formed is covered with a black matrix 410. Thus, the ESD circuit 450 is formed inside of the seal pattern 460, and the black matrix 410 is formed on the lower substrate 401 of the array substrate 500.

In addition, a top case 370 encompassing an outer edge of an LCD panel extends to cover a portion of the outside region O where the ESD circuit 450 is formed. The top case 370 may extend further as long as it does not contact a polarization plate 361 formed on a second substrate 480 of an upper substrate 600 facing the array substrate 500. Thus, the top case 370 may be directly above the ESD circuit 450. Therefore, light leakage occurring at the outside region O is prevented by the top case 370 and the black matrix 410.

In addition, a link portion (not shown) reaching the pad region Q from the seal line forming region P may be formed. The link portion may be connected to the pad region Q as an interval between gate lines or between data lines decreases. Therefore, it may be difficult to form the ESD circuit because of narrowness of the link portion. However, according to an embodiment of the present invention, the ESD circuit is formed in the outside region O not at the link portion, a sufficient space for the formation of the ESD circuit is secured. In any event, the ESD circuit is not limited in being formed in the seal line forming region P or the outside region O. For example, if the ESD circuit is designed to have a fine line width by improving a design rule, it may be formed at the link portion.

Figure 5A:
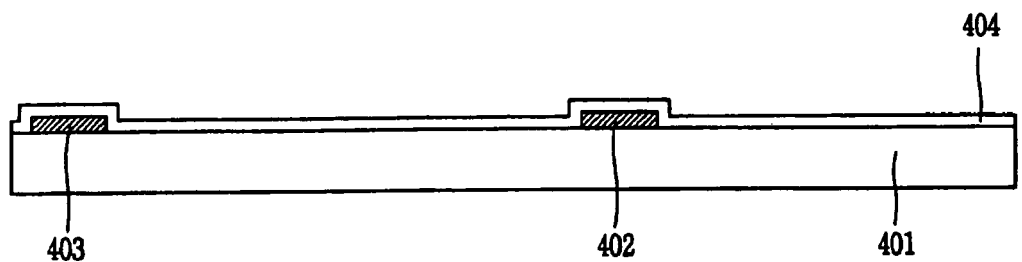
FIGS. 5A to 5G are cross-sectional views illustrating a method for fabricating a COT type LCD device in accordance with an embodiment of the present invention.

FIGS. 5A to 5G are cross-sectional views illustrating a method for fabricating a COT type LCD device in accordance with an embodiment of the present invention. As shown in FIG. 5A, a gate electrode 402 and a gate pad electrode 403 are formed on a lower substrate 401. The lower substrate 401 may be formed of glass. In addition, the gate electrode 402 and the gate pad electrode 403 may be formed by depositing a metal thin film using a sputtering method and by patterning the metal thin film into a predetermined pattern using a photolithography process. Then, a gate insulation layer 404 is formed on the gate electrode 402 and the gate pad electrode 403. The gate insulation layer 404 may be an silicon oxide film formed using a plasma enhanced chemical vapor deposition (PECVD) method.

Figure 5B:
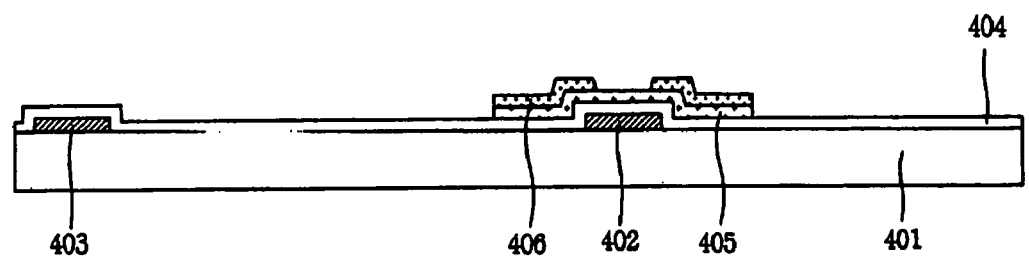

As shown in FIG. 5B, an active layer 405 and an ohmic-contact layer 406 are formed above the gate electrode 402. The active layer 405 may be formed by depositing a semiconductor layer using a PECVD method and by patterning the semiconductor layer using a dry etching process.

Figure 5C:
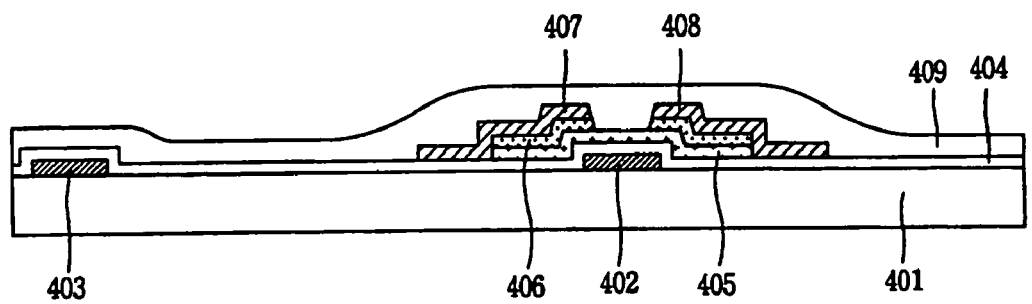

As shown in FIG. 5C, source and drain electrodes 407 and 408 are formed on the active layer 405 and the ohmic-contact layer 406. The source and drain electrodes 407 and 408 may be formed by depositing a metal thin film layer using a sputtering method and by patterning the metal thin film layer using a photolithography process. Although not shown, a data line may be formed at a pixel region when forming the source and drain electrodes 407 and 408. In addition, a passivation layer 409 is formed on the source and drain electrodes 407 and 408. The passivation layer 409 may be an insulation layer.

Further, although not shown in FIGS. 5A to 5C, an ESD circuit may be formed outside the pixel region. The ESD circuit may also be protected by the passivation layer 409.

Figure 5D:
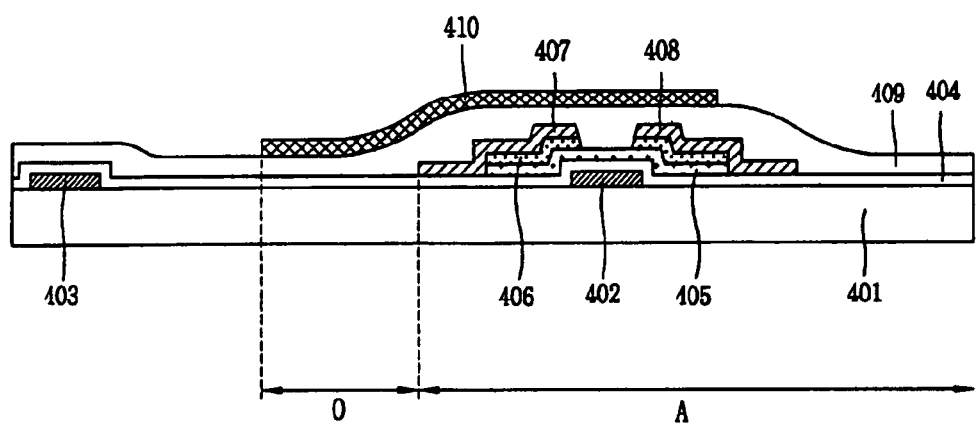

As shown in FIG. 5D, a black matrix 410 is formed on the passivation layer 409. The black matrix 410 is formed at the pixel region A and may include an organic film. The black matrix 410 is formed as a lattice shape, and covers the gate line and the data line (not shown), to thereby cover portions adjacent to the gate line and the data line which are reverse tilt domain regions. In addition, the black matrix 410 extends to cover the outside region O.

Figure 5E:
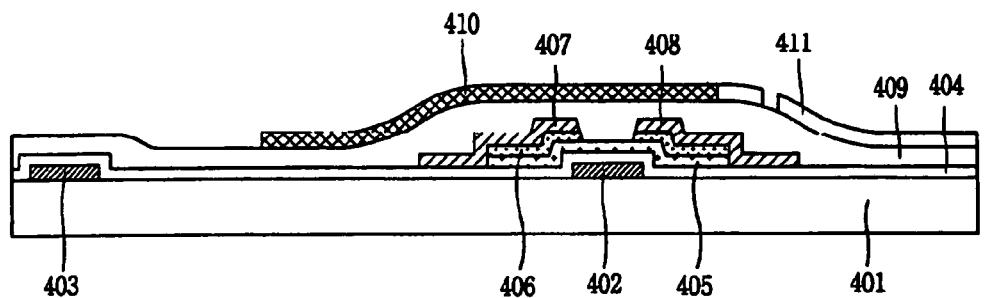

As shown in FIG. 5E, a color filter layer 411 is formed at every unit pixel. The color filter layer 411 may include one of red, green and blue sub-color filter layers, and may be formed using a photomask process and a pigment dispersing method. In particular, the color filter layer 411 is not formed at a predetermined region corresponding to the TFT.

In addition, although not shown, a contact hole that exposes the drain electrode 408 of the TFT is formed at every pixel. The contact hole is formed at a region where the color filter layer 411 is not formed so as to be easily formed only by removing a portion of the passivation layer 409. Further, another contact hole exposing one electrode of the ESD circuit and another contact hole for exposing the gate pad electrode 403 may be simultaneously formed when the contact hole exposing the drain electrode 408 is formed.

Figure 5F:
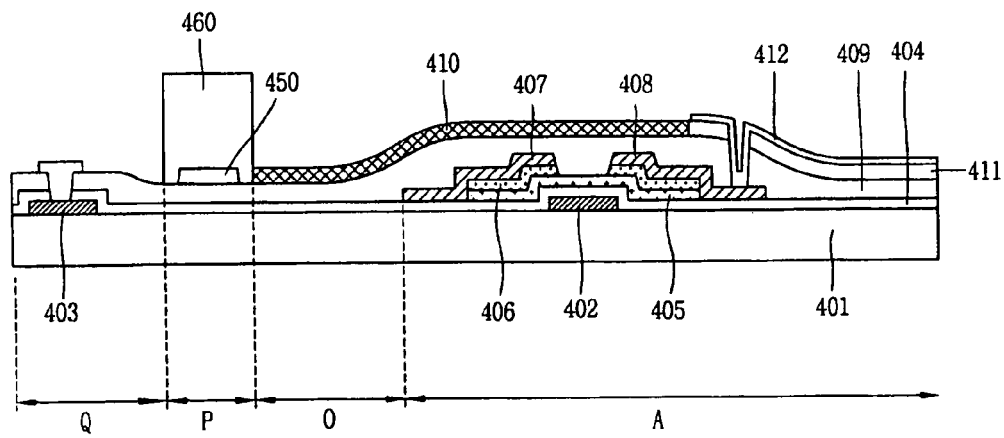

As shown in FIG. 5F, a pixel electrode 412 connected to the drain electrode 408 through the contact hole is formed at every unit pixel. The pixel electrode 412 may be formed by depositing an ITO layer using a sputtering method and by patterning the ITO layer using a photolithography process. In addition, when forming the pixel electrode 412, a pad of the pad region Q and an ESG circuit connection line 450 for connecting the ESD circuit with lines of the pixel region A may be simultaneously formed.

Further, a seal pattern 460 is formed in the seal forming region P. Alternatively, the seal pattern 460 may be formed on an upper substrate 480 (shown in FIG. 5G). Although not shown, an alignment film may be formed where the pixel electrode 412 is formed, and the alignment film may include polyimide.

Figure 5G:
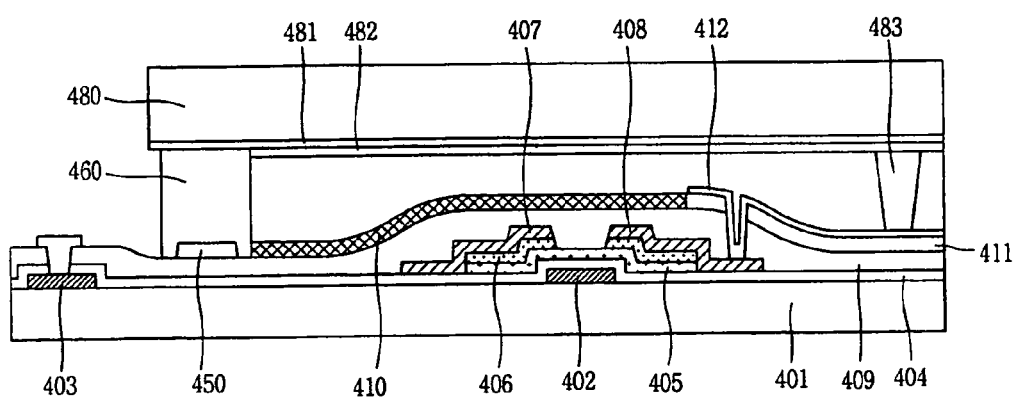

As shown in FIG. 5G, the upper substrate 480 is attached to the lower substrate 401 by the sealant pattern 460. The upper substrate 480 facing the TFT array substrate is formed through a separate process. In particular, a common electrode 481 is formed on the upper substrate 480, and an alignment film 482 is formed thereon. In addition, a black matrix for preventing light leakage occurring at the outside region is not formed on the upper substrate 480.

Before the lower and upper substrates 401 and 480 are attached, an alignment process of the upper substrate and the array substrate may be employed. In addition, after the attaching process, a liquid crystal material is filled in a cell gap between the lower and upper substrates 401 and 480 to form an LCD panel. Then, the LCD panel may be cut into a plurality of unit LCD panels.

As a result, the method for fabricating a COT type LCD device in accordance with an embodiment of the present invention includes forming a black matrix on an array substrate and extending the black matrix in an outside region immediately adjacent to the pixel region. Thus, the black matrix also prevents light leakage occurring at the outside region.

Further, in the method for fabricating a COT type LCD device in accordance with an embodiment of the present invention, the black matrix is simultaneously formed in both the pixel region and the outside region, thereby simplifying fabrication process and improving production efficiency. Hence, the process for forming a black matrix on the upper substrate is omitted.

It will be apparent to those skilled in the art that various modifications and variations can be made in the liquid crystal display device having a black matrix in a region outside of a pixel region and the method of fabricating the same of the present invention without departing from the spirit or scope of the invention. Thus, it is intended that the present invention covers the modifications and variations of this invention provided they come within the scope of the appended claims and their equivalents.

What is claimed is:

1. A color filter on thin film transistor (COT) type liquid crystal display device, comprising:
a pixel region having a plurality of unit pixels defined by intersections of gate and data lines, the gate and data lines formed on a first substrate, wherein the pixel region includes a thin film transistor and sub-color filter layers respectively formed at each of the unit pixels; and a first black matrix formed over the thin film transistor and between the sub-color filters, wherein the first black matrix does not overlap the sub-color filter layers, and wherein the thin film transistor includes a gate electrode, an active layer and source and drain electrodes formed on the first substrate;
a passivation layer on the thin film transistor, wherein the first black matrix and the sub-color filters are formed on the passivation layer;
a pad region receiving driving signals and applying the driving signals to the gate and data lines;
a seal pattern between the pad region and the pixel region;
a second black matrix at an outside region, the outside region being between the seal pattern and the pixel region, wherein the second black matrix is formed as an organic film, and is not overlapped with the sub-color filters, and the second black matrix is a portion extended from the first black matrix to a side of the seal pattern;
a top case covering the outside region, the top case being overlapped with the second black matrix;
an electrostatic discharge circuit between the pad region and the pixel region, the electrostatic discharge circuit formed on the first substrate, wherein the electrostatic discharge circuit does not overlap the second black matrix;
a pixel electrode on the sub-color filter layers, wherein the pixel electrode is contact with the drain electrode, and wherein the pixel electrode is not overlapped and is not in contact with the first black matrix and the second black matrix over the thin film transistor and the outside region, respectively;
a second substrate facing the first substrate; and
a liquid crystal layer between the first and second substrates.

2. The device of claim 1, wherein the electrostatic discharge circuit is formed under the seal pattern.

3. A liquid crystal display device, comprising:
a first substrate defining a pixel region, an outside region and a pad region, wherein the outside region is defined as a region between a seal pattern forming region and the pixel region;
a thin film transistor on the pixel region of the first substrate;
a passivation layer on the pixel region including the thin film transistor, the outside region and the pad region of the first substrate;
a color filter layer on the passivation layer;

a black matrix on the passivation layer covering the thin film transistor of the pixel region and the outside region, wherein the black matrix is an organic film and is not overlapped with the color filter layer, and the black matrix is extended from the pixel region to a side of a seal pattern;

a pixel electrode on the color filter layer, wherein the pixel electrode is contact with the thin film transistor, and wherein the pixel electrode is not overlapped and is not in contact with the black matrix over the thin film transistor and the outside region;

an electrostatic discharge circuit in the seal pattern forming region of the first substrate located between the pad region and the outside region;

a second substrate facing the first substrate;

the seal pattern attaching the first and second substrates to each other, the seal pattern covering the electrostatic discharge circuit; and a liquid crystal layer between the first and second substrates.

4. A liquid crystal display device, comprising:

a first substrate defining a pixel region, an outside region and a pad region, wherein the outside region is defined as a region between a seal pattern forming region and the pixel region;

a thin film transistor on the pixel region of the first substrate;

a passivation layer on the pixel region including the thin film transistor, the outside region and the pad region of the first substrate;

a color filter layer on the passivation layer;

a black matrix on the passivation layer covering the thin film transistor of the pixel region and the outside region, wherein the black matrix is an organic film and is not overlapped with the color filter layer, and the black matrix is extended from the pixel region to a side of a seal pattern;

a pixel electrode on the color filter layer, wherein the pixel electrode is in contact with the thin film transistor, and wherein the pixel electrode is not overlapped and is not in contact with the black matrix over the thin film transistor and the outside region;

an electrostatic discharge circuit in the seal pattern forming region of the first substrate located between the pad region and the outside region, wherein the electrostatic discharge circuit is formed under the seal pattern;

a second substrate facing the first substrate;

the seal pattern attaching the first and second substrates to each other, the seal pattern covering the electrostatic discharge circuit; and a liquid crystal layer between the first and second substrates.

* * * * *